United States Patent [19]

Welker

[11] 4,161,924
[45] Jul. 24, 1979

[54] SHELTER

[76] Inventor: Scott D. Welker, 1359 Winnette, Toledo, Ohio 43614

[21] Appl. No.: 795,107

[22] Filed: May 9, 1977

[51] Int. Cl.² .............................................. A01K 1/02
[52] U.S. Cl. .................................... 119/19; 119/51 R; 119/120
[58] Field of Search ........................ 119/19, 51 R, 120

[56] References Cited

U.S. PATENT DOCUMENTS

| | | | |
|---|---|---|---|
| 1,296,057 | 3/1919 | Ellsworth | 43/42.72 |
| 1,377,800 | 5/1921 | Brown | 119/120 X |
| 1,553,544 | 9/1925 | Linnemann | 119/19 |
| 1,563,212 | 11/1925 | Madiar | 119/120 |
| 2,445,055 | 7/1948 | Capaul | 119/19 X |
| 2,845,896 | 8/1958 | Copeland | 119/51 R |
| 2,953,116 | 9/1960 | Lund | 119/120 |
| 3,026,844 | 3/1962 | Spindler | 119/19 |
| 3,129,693 | 4/1964 | De Vore | 119/19 X |
| 3,147,736 | 9/1964 | Daniel | 119/19 |
| 3,861,356 | 1/1975 | Kulka | 119/19 |

FOREIGN PATENT DOCUMENTS 35387  4/1886  Fed. Rep. of Germany ........... 119/120

*Primary Examiner*—Louis G. Mancene
*Assistant Examiner*—Daniel J. Leach
*Attorney, Agent, or Firm*—Hugh Adam Kirk

[57] ABSTRACT

A molded reinforced plastic dome-shaped shelter for animals, having a door, a base having a floor spaced from the ground, a feeding stall in an outside alcove in the shelter housing, a track surrounding the shelter adjacent its base, a glide freely movable around said track for attachment of a tether for the animal, and spike means for anchoring the housing and base together and to the ground. The housing and base may be of one piece of plastic and then separated, or may be made into sectors and assembled by bolts or other fastening means. The door may be locked so the shelter may be used as a shipping container and lifted by the track around the base as its handle. The feeding stall or alcove is preferably provided with two dishes, one for water and the other for dry food, and their supply may be maintained automatically by containers mounted above these dishes in the alcove. The track and its glide may take many forms with the glide either sliding or rolling inside a C-shaped cross-section track or around the outside of the track. The tether attached to the glide may be provided with a resilient means to reduce shocking jerks on the glide and track.

45 Claims, 18 Drawing Figures

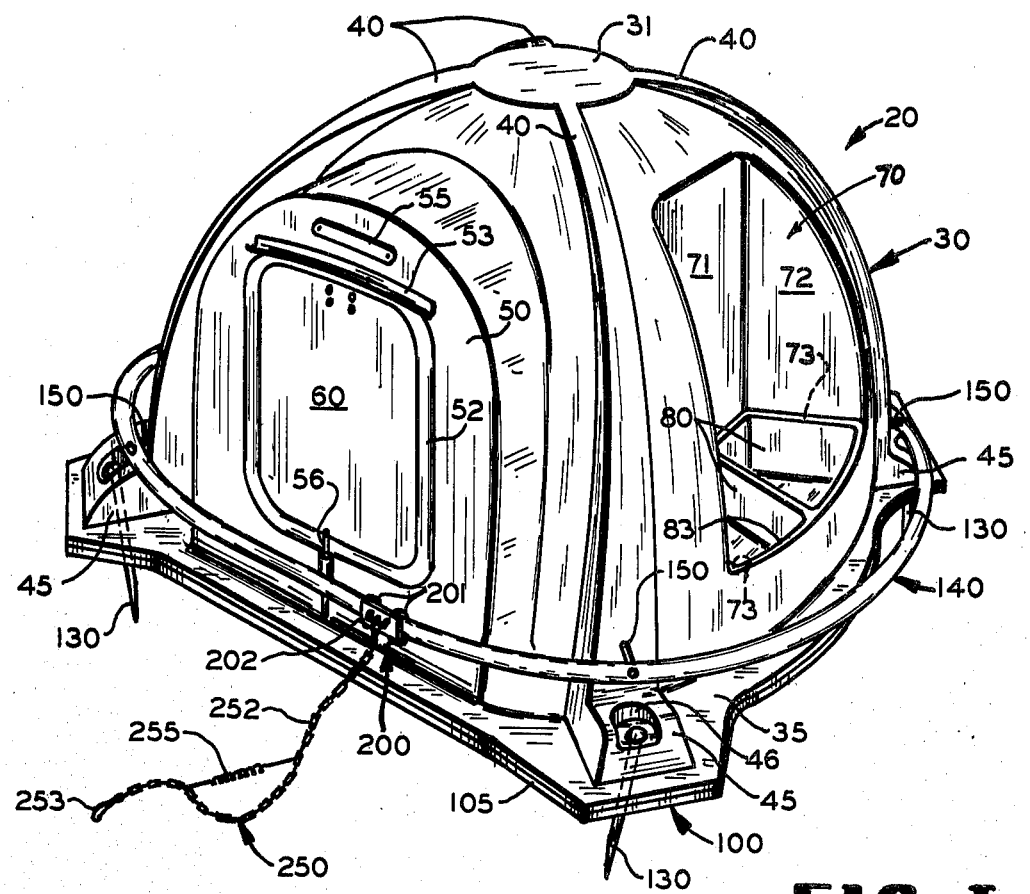
FIG. I
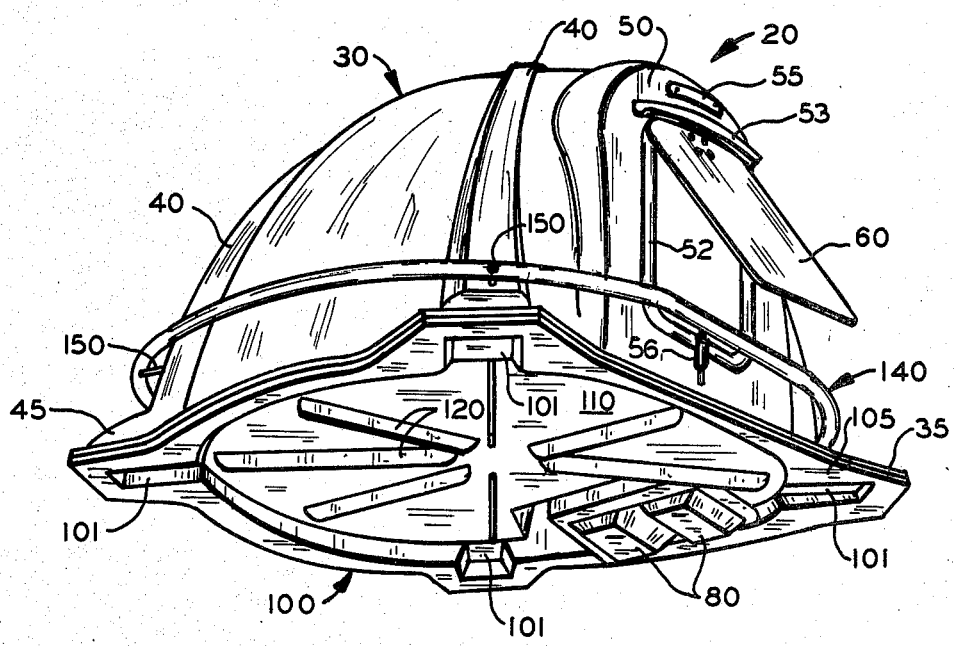
FIG. II

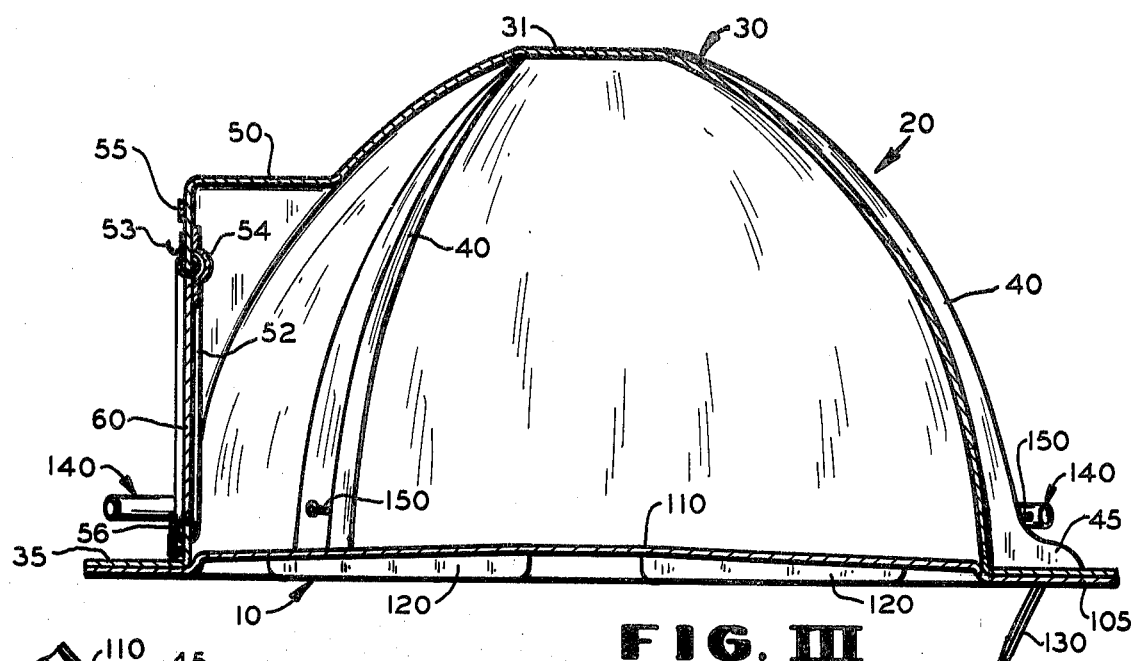
FIG. III
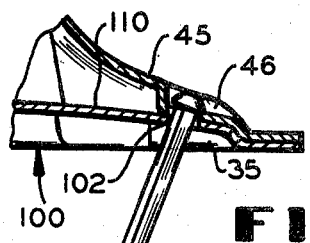
FIG. IV
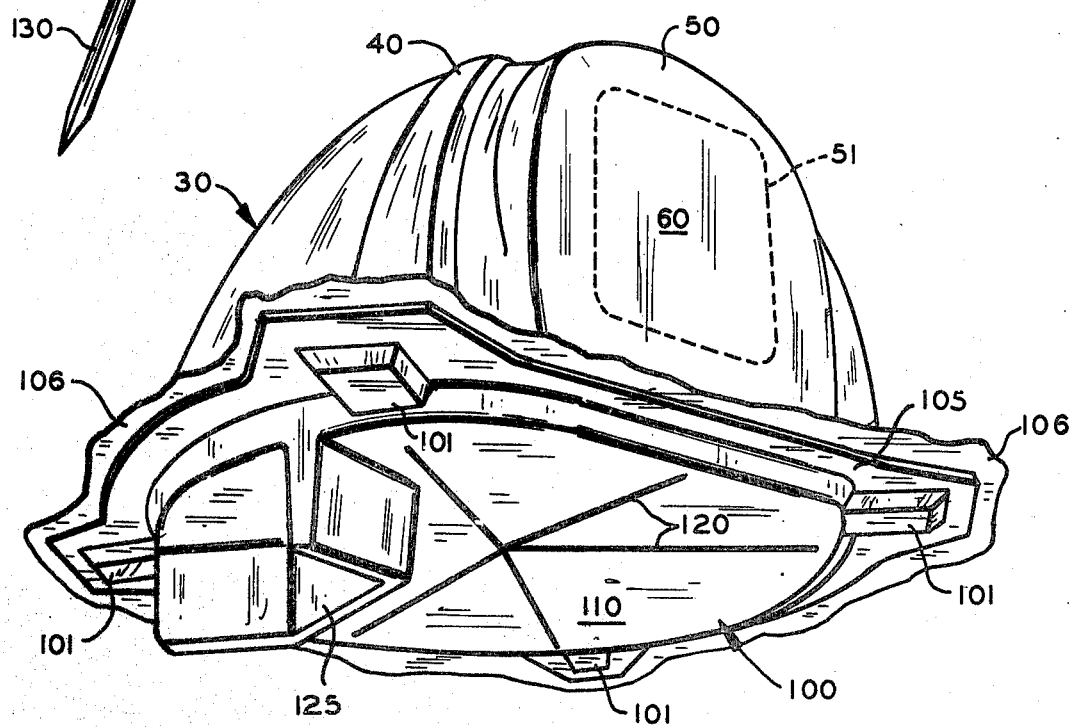
FIG. V

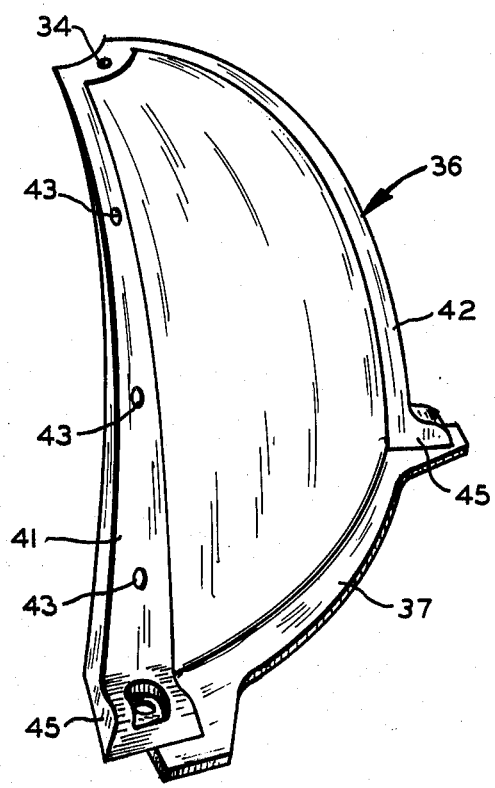
FIG. VI
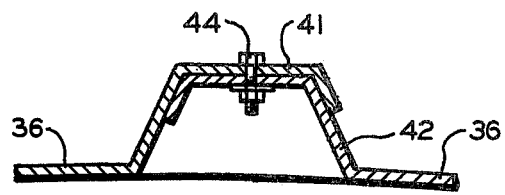
FIG. VII
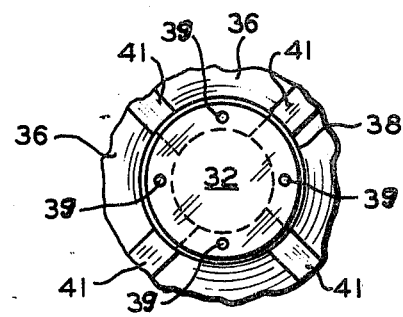
FIG. IX
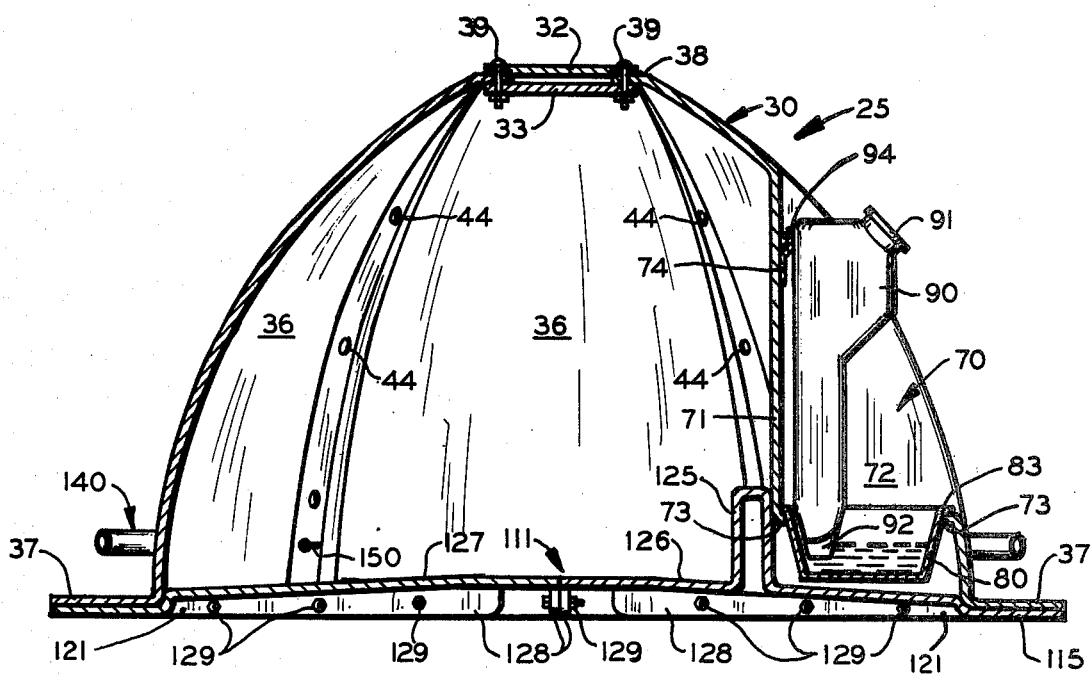
FIG. VIII

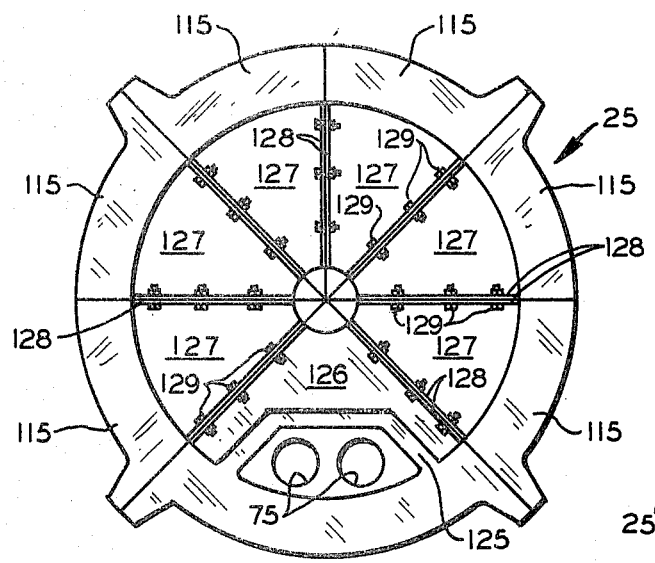
FIG. X
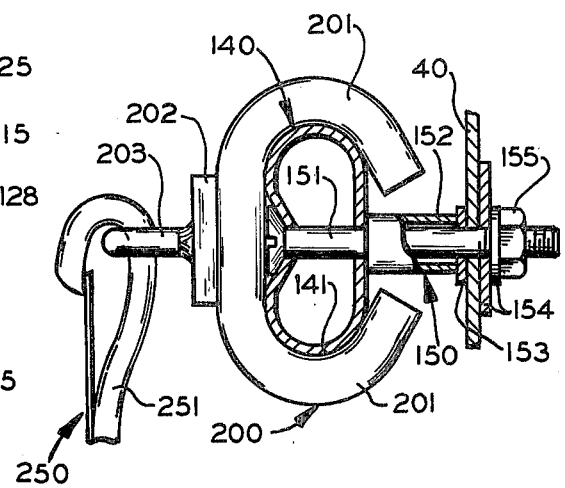
FIG. XI
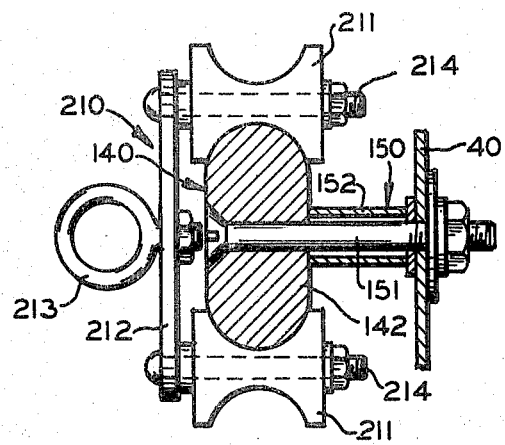
FIG. XII
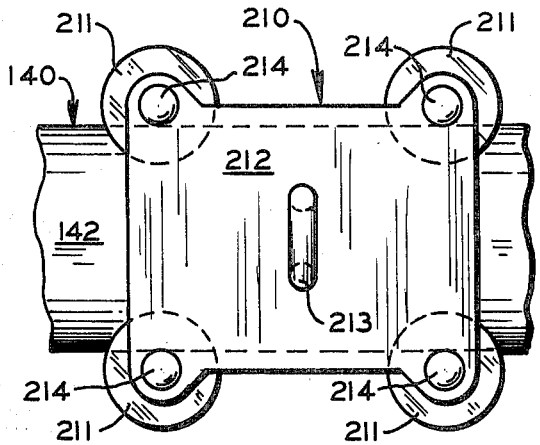
FIG. XIII
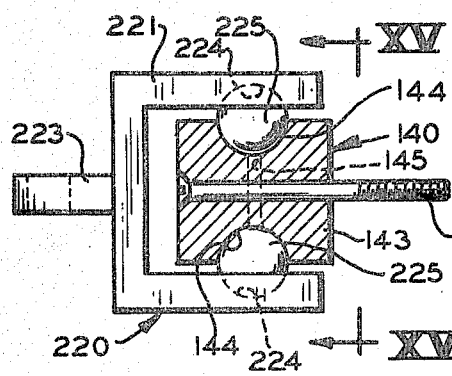
FIG. XIV
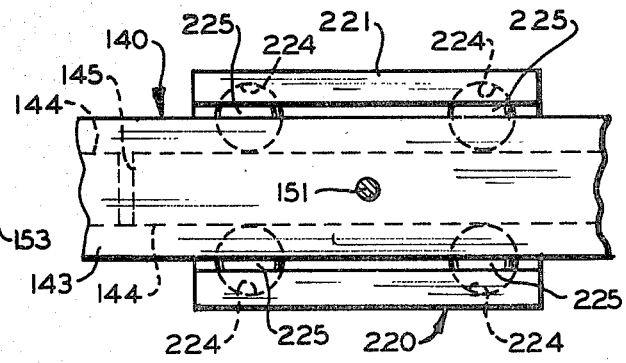
FIG. XV

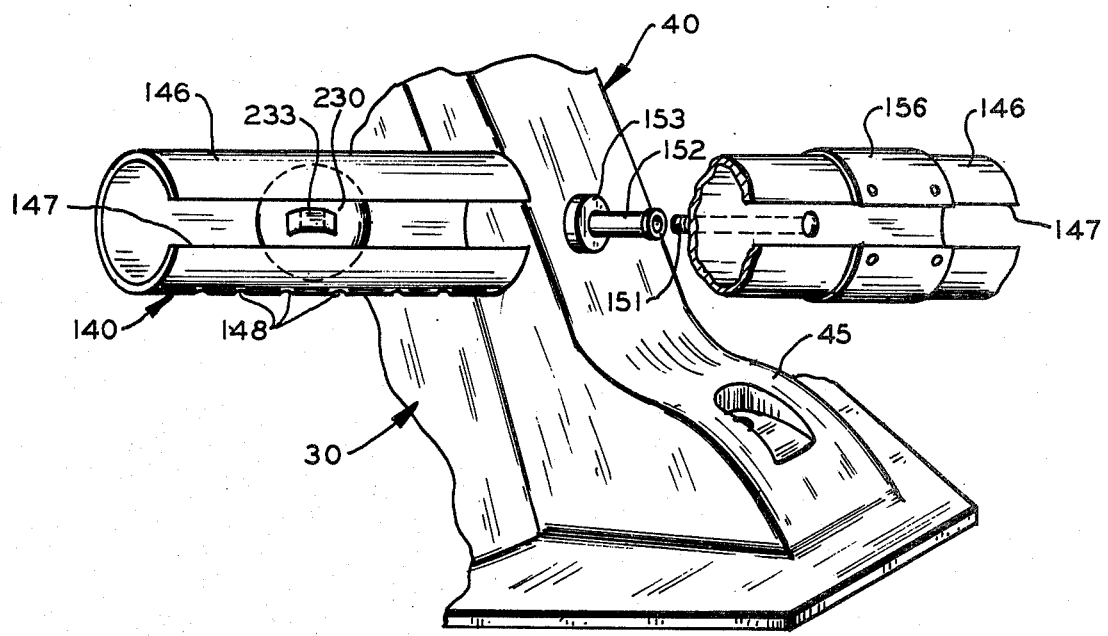
FIG. XVI
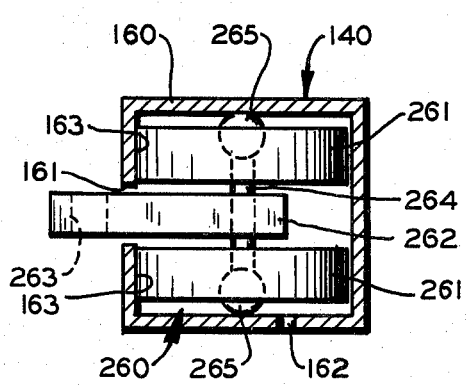
FIG. XVII
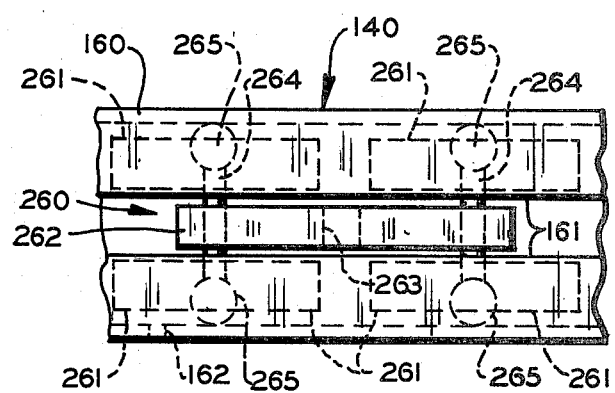
FIG. XVIII

SHELTER

BACKGROUND OF THE INVENTION

Previously, animal shelters were clumsy and heavy to move, made out of wood, were hot in summer and cold in winter, rapidly deteriorating with the weather both in appearance and utility.

Furthermore, most animal shelters did not provide an outside feeding stall which can not be easily knocked over by the animal or its tether, nor a tether which cannot become tangled and/or shortened to limit the initial range of movement of the animal.

SUMMARY OF THE INVENTION

Generally speaking, this invention comprises a novel pet shelter incorporating an outside feeding stall and a non-tangling tether for the pet surrounding the shelter and feeding stall.

The shelter or housing may comprise a dome with two or more outwardly extending ribs and with a door opening and an outside feeding stall in said dome. This dome may be made of any desired material, such as metal, wood, reinforced plastic, fiberboard, or the like; however, a preferred embodiment of this invention is composed of one piece of glass fiber reinforced polyolefin plastic. Also the size of the dome may vary, depending upon the size of the animal to be sheltered therein, and it also may be of different colors and shapes other than semispherical, such as polygonal, oval, rectangular and/or a combination of geometric shapes. The apex of the dome-shaped housing may be horizontally flat or rounded, and if the dome and/or base is composed of separate sector shaped sections, these sections may be bolted together along their flanged edges, and may comprise a disc or plate for joining the adjacent apexes of all the side spherical triangle sections together. The door opening in one side of the housing, preferably between a pair of adjacent ribs, may have its doorjamb extended out to be substantially vertical, with a top hinge to attach a swinging door so that the door may be easily operated by the animal using the shelter. Furthermore, the lower edge of the door may be bolted if the shelter is to be used for locking or transporting an animal therein. Weather stripping may be provided around the door or its opening which may comprise covering the edge of the door or jamb with a slit tubular rubber hose or a similar plastic or flexible material. If desired, the top of the door may be provided with an eave trough for diverting rain water from running into the shelter at the bottom of the door opening.

Adjacent the door or in the adjacent spherical sector between two adjacent ribs outside the shelter housing there is provided an alcove which extends inwardly with substantially vertical back and side walls and a substantially horizontal raised bottom, which may be cut out for supporting one or more food dishes such as a drinking bowl and a dry feed bowl. These bowls may be molded into the housing itself, however it is desirable that they may be easily removed for washing, and the housing may be provided with apertures in the horizontal floor of the alcove for fitting standard size bowls. If the animal is to remain unattended for more than a day, supply tanks for water and dry feed may be provided above the bowl, which maintain a given level of water and feed in the bowls automatically by gravity.

Around the lower edge of the housing there is preferably provided an outwardly extending flange which nests around the raised central or floor portion of the base. Furthermore, the lower ends of the ribs may be outwardly flanged and provided with apertures through which stakes may be driven for anchoring the housing to the ground or to the floor upon which it is supported.

Beneath the dome there is preferably provided a base portion which comprises a central floor portion which is raised from its peripheral flange to space the floor inside the kennel off of the ground, thereby insulating it therefrom. This base may be made out of the same or different material from that of the dome or housing and is preferably contoured so that any liquids will drain from the floor, such as by providing grooves and/or drain holes therein. If these grooves are radial they may also provide parting lines for separable sectors of the base. Also provided in the base is an upstanding wall portion which fits around the outside of the feeding alcove inside the shelter so that there is no access to the feeding bowls from within the shelter, nor can they be knocked out of place by the animal inside the shelter. This partition or fence may be molded integrally into the floor portions of the base.

An important feature of this invention is the provision of a ring or endless track attached to the ribs above but adjacent to the base flange portion of the dome or housing. This track is provided with a glide, trolley or slider which is free to slide completely around the housing. This glider is provided with a hook or loop to which a tether chain or rope may be attached of sufficient length so to also retain the animal and permit it free access to an area around the outside of the housing as well as to the inside of the housing. Since this track extends outside the feeding alcove, there is no possibility of the animal upsetting the feeding dishes by any motion of his tether attached to the glide in the track. This tether may be provided with a shock absorbing or resilient means to ease any jerking on the rail by the animal as well as of the animal. This rail may be of metal or plastic, may be solid or hollow, and the glide thereon may be provided with frictionless bearings or plastic fingers, which run inside or partially surround the rail.

OBJECTS AND ADVANTAGES

It is an object of this invention to provide a simple, efficient, effective, sanitary, economic, durable, portable, stable, insulated and weather-proof animal shelter of few parts that is easy to keep clean and also can be used as a shipping container for an animal.

Another object is to provide such a shelter which may be used as a play-house for children, as well as for pets or domestic animals, and also to provide a stall for feeding dishes, which dishes can not be overturned by the animal or its tether.

A further object is to provide such an animal shelter which can be easily shipped in knock-down nested condition, and be easily assembled, and has a tether means for the animal which is stable and can not become tangled and shortened thereby.

BRIEF DESCRIPTION OF THE VIEWS

The above mentioned and other features, objects, and advantages, and a manner of attaining them are described more specifically below by reference to embodiments of this invention shown in the accompanying drawings, wherein:

FIG. I is a front, side and top perspective view of one embodiment of the animal shelter of this invention showing an entrance door, an outside feeding stall, and a surrounding rail with a tether attached to a glide on the rail;

FIG. II is a front, opposite side and bottom perspective view of the shelter embodiment shown in FIG. I with the door partially open;

FIG. III is a vertical sectional view taken from the front to the back through the door near one of the back ribs of the embodiment shown in FIG. I;

FIG. IV is an enlarged vertical section view through the foot of the rib shown at the right in FIG. III.

FIG. V is a perspective view similar to FIG. II but with the dome and base shown jointed together as they come out of a single mold, before the base is separated and the door is cut out;

FIG. VI is a perspective view of one-fourth of the dome shown in FIG. I of another embodiment showing that the shelter can be made in separate spherical sector shaped sections instead of integrally as shown in FIG. V;

FIG. VII is an enlarged cross-sectional view through one of the ribs of the embodiment shown in FIG. VI showing how two adjacent sector sections may be overlapped and attached to prevent leakage.

FIG. VIII is a vertical sectional view similar to that of FIG. III but orthogonally thereof and of the embodiment shown in FIG. VI and showing a dry food supply chamber above the food bowl in the feeding stall;

FIG. IX is a top view of the central portion of the dome shown in FIG. VIII;

FIG. X is a reduced bottom view of the embodiment shown in FIGS. VI and VIII showing how the base may be assembled from sector shaped sections also;

FIG. XI is an enlarged cross-sectional view through the rail adjacent the glide shown on the track in FIG. I at a mounting bolt for the rail into a rib of the housing;

FIG. XII is an enlarged cross-sectional view similar to FIG. XI but of another embodiment of the track and a partially surrounding glide;

FIG. XIII is a side view of the embodiment of the glide shown in FIG. XII;

FIG. XIV is still another embodiment of a track and a partially surrounding glide similar to that shown in FIGS. XI and XII;

FIG. XV is a rear view of the glide shown in FIG. XIV taken along line XV—XV thereof;

FIG. XVI is an enlarged perspective view of a further track and glide embodiment showing a hollow track of C-shaped cross-section and its mounting to a rib, and an inner sliding glide;

FIG. XVII is a cross-sectional view of still a further embodiment of a C-shaped cross-sectional track but with a roller glide mounted therein; and FIG. XVIII is a front elevation of the glide and section of track shown in FIG. XVII.

DETAILED DESCRIPTION OF PREFERRED EMBODIMENT

Referring generally to FIGS. I and II there is disclosed an assembled shelter 20 according to one embodiment of this invention for use as a pet shelter. This shelter 20 comprises a unitary reinforced plastic dome-shaped housing 30 provided with outwardly extending semicircular reinforcing and orthogonally arranged ribs 40, an opening or doorjamb portion 50 in one side of the dome having a movable door 60 for closing that opening, and an inwardly extending food stall 70 for a pair of removable bowls or feeding dishes 80 which stall is located in another side of the dome 30.

A separate base 100 comprises an outer peripheral flange portion 105, which may be congruent with the outer peripheral flange 35 integral with the dome 30, and a central raised floor portion 110 which may be reinforced by draining ribs or troughs 120. The base 100 and dome 30 may be nested together and anchored to their support or the ground by means of stakes 130 which extend through the foot portion 45 of the lower end of the ribs 40 onto the flange 35.

Around the base of the dome 30 above the flange 35, below the door 60, and below the top edges of the bowls 80 is a circumferential track or rail 140 which may be supported at the ribs 40 by bolt means 150, which track 140 supports and guides a freely moving glide or slider 200 to which is attached a tether 250 for fastening to a pet to be restrained thereby.

In the sections to follow, the above mentioned parts will be described in more detail and other embodiments will be given similar reference characters having the same 10's digit numbers as those mentioned above wherever possible.

A. The Housing or Dome

One of the embodiments 20 of the dome 30 shown herein is made of glass fiber reinforced polyolefin plastic which may be formed in a spin mold together with the base 100 to form a hollow shape similar to that shown in FIG. V. After molding, the base part 100 and dome part 30 are separated along the peripheral edges of their flanges 35 and 105 by removing the flash 106 by cutting or sawing. Similarly the opening in the doorjamb portion 50 can be cut or sawed out around the dotted line 51 shown in FIG. V to form the door 60. The size of this shelter may vary depending upon the size of the pet that is to be housed therein and separate molds are used for the different size shelters.

The hemispherical housing part 30, shaped similar to that of an eskimo igloo with the outwardly extending doorjamb part 50, has a flat top section 31 from which emerge the four orthogonally outwardly and downwardly arcuate extending U-shaped cross section channels 40 which increase in depth and thickness or width as they approach the base or bottom of the dome adjacent the flange 35 to spread out into feet portions 45. Each of these feet portions 45 may have indented portions 46 with apertures therein through which the stakes 130 may be inserted, preferably at an angle converging inwardly toward the vertical center axis of the housing 30. The lower or bottom peripheral flange 35 of the dome 30 may extend around the outside of these feet 45 as shown in FIGS. I, III and IV.

Around the opening in the doorjamb portion 50 there may be provided a plastic rim 52, which may be made from a longitudinally split piece of plastic or rubber tubing, to cover the cut edges of the opening. Above this opening there may be attached an eaves trough 53 to divert rain from falling into the opening. The door 60 may be hung by a hinge 54 attached to and between the top inside of the door panel 60 and to the adjacent doorjamb so that the animal can push on the door to swing it either in or out for entering or leaving the housing or shelter 20. Above the door there may be provided a nameplate 55 on which the name of the pet, the owner, the shelter, and/or its manufacturer may be placed. If desired, there may be provided a bolt latch or lock 56 for locking the door 60 in the event the shelter is not to be used by the pet, or is to be used as a shipping container for the pet. This bolt latch 56 also may include a hasp, loop, or other means so that it may be locked, such as with a padlock.

Although the housing 30 and base 100 are easily separated and can be nested for shipping, their space may be further reduced by forming the housing part 30 into four or more sections 36 as in the embodiment 25 shown in FIGS. VI through X, each of which sections 36 is provided with the bottom flange 37 and with opposite overlapping channel rib edges 41 and 42 which interfit or nest as shown in FIG. VII to form a weather and rain-proof joint. These overlapping edge channels 41 and 42 are provided with spaced aligned apertures 43 for bolts 44 for fastening the sections 36 together. Since the nuts for these bolts 44 are sunk in the channels 42 away from the interior of the housing they do not snag or scratch the pets or animals inside the shelter. The tops or apexes of these sections 36 may be connected together by being sandwiched between a couple of parallel circular plates 32 and 33 as shown in FIGS. VIII and IX, which plates 32 and 33 may be fastened together through apertures 34 at the apex of each of the sections 36 and in apertures in the periphery of the plates by means of bolts 39. At least between the plate 32 and apexes of the sections 36 a ring gasket 38 is provided to prevent leakage.

Another side of the housing or dome 30 is provided with an insert alcove or feeding stall 70 having a vertical rear wall 71, side walls 72 and a peripheral bottom wall flange 73 for supporting the outer peripheral flanges 83 of the feeding dishes or bowls 80, for their easy removal. If desired, the back wall 71 may be provided with a pair of hooks 74 for separately supporting water and dry food containers 90 as shown in FIG. VIII, which containers 90 may be removably supported by loops 94 that engage the hooks 74. The upper open ends of these containers 90 are provided with removable closures 91 for filling, and with lower spout portions 92 that extend into the bowls 80 to maintain a substantially constant level of food and water in the bowls 80. The upper and lower openings in the containers 90 may be different in diameter depending upon the consistence of the material placed into them, i.e. the water container may have smaller openings 91 and 92 than the dry food container. The bowls 80 may be separate or joined for fitting into and on the flanges 73 of the cut-out portion of the floor of the alcove 70. Thus this cut-out portion may comprise two circular holes 75 such as that shown in FIG. X for two separate standard sized bowls, or may be a rectangular cut-out portion for a pair of integral bowls as shown in FIGS. I and II.

It is to be understood that the sections of the shelter 25, which are provided with the doorjamb portion 50 and with the feeding alcove or stall 70, have configurations similar to sectors of the dome 30 between the ribs 40 shown in FIG. I, and thus have different forms than that of the two smooth rear sections 36 shown in FIGS. VI and VIII.

B. The Base

The base portion 100 shown in FIG. II is shown inverted in FIG. V and is provided with lower peripheral flange 105 which conforms with the flange 35 even to the extensions under the feet portions 45 with nesting feet parts 101 in which apertures 102 (see FIG. IV) are provided for the stakes 130, which apertures 102 are aligned with the apertures in the depressions 46 in the feet 45.

The raised or central floor portion 110 of the base is shown in FIG. III to be slightly convex upwardly for draining purposes, namely higher at the center than at the peripheral edges, and may be reinforced by radially downwardly extending ribs 120, which ribs 120 also can act as drains and be provided with one or more holes 121 along their lower edges for the draining of liquids.

As shown in FIGS. V, VIII and X, the floor portion is provided with an upstanding wall portion 125 surrounding the feeding alcove 70 so that the pet inside the shelter cannot have access to the feeding bowls 80 and will not be able to knock them out of place and/or spill the water and food in them. Thus, the lower edges of walls 71 and 72 of the feeding stall nest inside the top edge of the wall 125. This wall 125 is shown inverted in FIG. V and in its operative position inside the housing in FIG. VIII. It is molded integrally into the floor 110 or section 126 thereof in the event the floor is divided into pie-shaped or sector-shaped sections 126 and 127 as shown in FIGS. VIII and X of the embodiment 25 of the shelter. These sector sections 126 and 127 are provided with downwardly extending flanges 128 which may be bolted together by bolts 129 as shown in FIGS. VIII and X. These sections 126 and 127 are also provided with a peripheral flange portion 115 as the flange portions 105 of the full base shown in FIGS. I through V. The floor 111 provided by these separate sectors 126 and 127 also is convex for draining purposes (see FIG. VIII).

It is to be understood that a base of one piece as shown in the FIGS. I through V may be used in combination with the separate dome sectors 36 or vice versa, and that the number of sectors or divisions into which the dome housing 30 and its base 100 are divided may be varied, including the number of ribs 40 without departing from the scope of this invention.

C. The Track and Tether

Referring now to FIGS. I and XI through XVIII of different embodiments of the track or rail 140 surrounding the lower portion of the housing 30 of shelters 20 or 25, several different embodiments of this track and its trolley to which the tether is attached are described. However, other embodiments may be employed without departing from the scope of this invention.

First, the track 140 shown in FIG. I with its slider glide 200 are shown enlarged and in partial cross-section in FIG. XI, in which the track 140 is shown to be a flattened tube or conduit 141, which tube 141 adjacent the rib portions 40 is provided with transverse supports 150 comprising countersunk head bolt 151 which extends diametrically through the minor cross-sectional axis of the tube 141, through a spacer sleeve 152, an outer washer 153, the outer surface of the rib 40, inside washers 154, and nut 155 threaded on the inner end of the bolt 151. Similar supporting structures are also shown in FIGS. XII, XIV, XVI and XVII; however, other means may be provided for supporting this track without departing from the scope of this invention. The washers 154 and nut 155, as well as the inner threaded end of the bolt 151, do not project into the channel trough of the rib 40 as far as the trough's depth, and therefore will not easily snag any animal which is inside the shelter. This is also the case for the bolts 44 described in combination with the above mentioned embodiment 25 shown in FIGS. VI, VII, and VIII described above.

The specific glide trolley or slide 200 shown in FIGS. I and XI comprises a pair of spaced C-shaped arms 201 which surround the rail or track 140 or 141 and preferably are coated with a frictionless material, such as a polytetrafluoroethylene plastic, and are sufficiently loose so as to slide very easily completely around the track 140 or 141. The open part between the C-legs permit easy sliding past the support members 150. Joining these two C-shaped leg members 201 there is provided a bridging or connecting means 202 to the center of which may be attached an eye or loop 203 to which one end 252 a flexible cable, chain I, tether 250 may be readily connected, such as by a spring-type hasp means 251. However, a rope or other means may be tied through the loop 203. Furthermore, to aid the sliding of the glide 200, the outside of the tube 141 or track 140 may be coated with a non-friction material.

One form of a tether that may be attached to the loop or eye 203 may comprise a chain 242 as shown in FIG. 1, which may have at its opposite or outer end another snap hook 253 similar to 251 shown in FIG. XI. Intermediate the ends of the tether chain 252 there is provided a resilient means 255, such as a helical tension spring, so that as the pet attached to the end 253 of the tether 250 approaches the limit of its length, the stopping of the pet will be retarded gradually by the spring 253, and not only relieve jerking of the pet but also jerking on the housing, its rail 140 and its anchoring stakes 130.

Referring to another embodiment of a glide or trolley 210, which may run on a track 142 similar in cross-section to rail 141, but made of a solid bar of material as shown in FIG. XII, this trolley 210 comprises a set of four concaved grooved rollers 211 connected at the four corners of a mounting plate member 212, the center of which may be provided with an integral or screwed-on loop or eye 213. These rollers 211 may be journalled on axle bolts 214 and reduce the friction of the movement of the trolley 210 and may be made of plastic.

Still another embodiment of a type of trolley 220 which can be mounted on a solid track 143 is shown in FIGS. XIV and XV, which track 143 has a rectangular cross-section with a top and bottom or diametrically opposite central grooves 144 and may be provided at intervals with drain holes 145 so as to prevent the collection of moisture or water in the upper grooves 144. For this track 143, the fastening bolt 151 may be a little longer than the bolts shown in the embodiments of FIGS. XI and XII. In this embodiment, the trolley member 220 may comprise a U-shaped channel member 221 with an integral loop or eye 223 on its outer side, and inside its C-shaped channel on opposite legs thereof are provided a spaced pair of opposing spherical sockets 224 for ball bearings 225 that maintain, guide and permit substantially frictionless movement of the trolley glide 220 along the double-grooved rail 143.

Other embodiments of the track 140 involve a track 146 (see FIG. XVI) of hollow C-shaped cross-section with its open slit 147 extending outwardly all around the housing 30, and being provided along its lower edge with drain holes 148. This particular track 146 may be supported by a surrounding C-shaped clamp 156 which may be attached to the rail 146 and which clamp 156 is attached by the bolt 151 and/or the track 146 may be directly attached by the bolt 151 with its head countersunk in the inside wall of the track 146 opposite the slot 147. Herein, the glide or slide member 230 may comprise an elongated or prolate ellipsoid or ball that has an eye or loop 233 which extends outwardly through the slit 147 in the track 146. This member 230 freely slides along inside the track 146 with its loop 233 projecting from the slot 147 for the attachment of the tether 250.

A still further embodiment employing a C-shaped track 160 is shown in FIGS. XVII and XVIII, in which the cross-section of this track is substantially rectangular with drain holes 162. The inner surfaces 163 thereof adjacent and on opposite sides of the slit or longitudinal opening 161 are in substantial alignment so as to provide surfaces for two pairs of ball bearing rollers or wheels 261 on the inner trolley 260, which wheels 261 may be mounted on a connecting plate 262 which extends out through the slit 161 and has an eye or opening 263 to which a tether 250 may be attached. These pairs of wheels 261 may be mounted on vertical shafts 264 and the outer axes of these shafts may be provided with ball bearings 265 to guide and reduce friction of the outer disc-shaped surfaces of the wheels 261 against the opposite or top and bottom inside surfaces of the C-shaped track member 160. These ball bearings 265 may be journalled in semicircular sockets at the ends of the axles for the wheels 261.

The monorail or track 140, 141, 142, 143, 146 and 160 may be made of metal or plastic, molded or extruded, and may take other cross-sectional shapes than those shown, including square, oval and circular without departing from the scope of this invention. Furthermore, these tracks and/or trolleys may be coated with anti-frictionless coatings such as polytetrafluoroethylene, or a lubricant, but preferably are provided with means which require as little maintenance as possible, such as low coefficient of friction non-corrosive materials or coatings on adjacent sliding and/or rolling contacting surfaces. Furthermore, it should be understood that the track 140 can be used as a handle for lifting or moving the shelter 20 or 25.

While there is described above the principles of this invention in connection with specific apparatuses, it is to be clearly understood that this description is made only by way of example and not as a limitation to the scope of this invention.

I claim:

1. A shelter comprising:
  (A) a housing having an opening for a door and an outside feeding stall, and
  (B) an endless track surrounding and near the base of said housing and outside said feeding stall,
  (C) a glide on said track, and
  (D) a tether attached to said glide.

2. A shelter according to claim 1 wherein said housing is made of reinforced plastic material.

3. A shelter according to claim 1 wherein said housing is substantially dome-shaped.

4. A shelter according to claim 1 wherein said feeding stall contains a pair of removable bowls.

5. A shelter comprising:
  (A) a housing having an opening for a door and an outside feeding stall,
  (B) a rail surrounding the base of said housing and said feeding stall for a glide and tether,
  (C) a pair of removable bowls in said feeding stall, and
  (D) a removable reservoir for maintaining a level of material from said reservoir in at least one of said bowls.

6. A shelter according to claim 1 wherein said housing includes a separable base providing a floor spaced above the support for said housing.

7. A shelter according to claim 6 wherein said floor comprises a wall around said feeding stall.

8. A shelter comprising:
(A) a housing having an opening for a door and an outside feeding stall,
(B) a rail surrounding the base of said housing and said feeding stall for a glide and tether, and
(C) a separable base providing a floor spaced above the support for said housing, and said base being provided with at least one draining aperture.

9. A shelter according to claim 1 having a base peripheral flange.

10. A shelter according to claim 9 wherein said flange is provided with apertures for stake means for anchoring said housing to its support.

11. A shelter according to claim 1 wherein said housing is provided with an eaves trough above said door opening.

12. A shelter according to claim 1 wherein said door is provided with a latch.

13. A shelter according to claim 1 wherein said housing is provided with spaced outwardly extending ribs.

14. A dome-shaped shelter for animals comprising:
(A) a base having floor with a downwardly offset peripheral flange,
(B) a dome cover for said base having a downwardly offset peripheral flange seating in said base peripheral flange, an inwardly extending outside feeding stall and an animal opening in said side of said dome,
(C) at least one removable feeding bowl seated in said stall, and
(D) a plurality of spaced pin means penetrating said flanges for anchoring said dome and said base to their supporting surface.

15. A shelter for animals comprising:
(A) a base having floor with a downwardly offset peripheral flange,
(A) a cover for said base having a downwardly offset peripheral flange seating in said base peripheral flange, and an animal opening in said side of said cover,
(C) a continuous rail track completely around the lower edge of said cover above said flanges,
(D) a glide on and movable along said track,
(E) a tether having one end attached to said glide, and
(F) a plurality of spaced pin means penetrating said flanges for anchoring said cover and said base to their supporting surface.

16. A shelter comprising:
(A) a housing having an opening for a door and an outside feeding stall,
(B) a rail surrounding the base of said housing and said feeding stall for a glide and tether, and
(C) spaced outwardly extending ribs on said housing provided with means for supporting said surrounding rail.

17. A shelter according to claim 16 wherein said trolley on said track is unobstructed by said supports for said rail.

18. A shelter according to claim 15 wherein said rail track comprises a continuous hollow tube.

19. A shelter according to claim 15 wherein said rail track comprises a channel having a C-shaped cross-section with its open side outwardly from said housing.

20. A shelter according to claim 18 wherein said glide is freely movable longitudinally inside said rail track.

21. A shelter according to claim 20 wherein said glide comprises means for substantially surrounding said rail track.

22. A shelter according to claim 20 wherein said glide includes means for attaching it to said tether.

23. A shelter according to claim 20 wherein said tether includes a resilient section between its ends for absorbing jerks between the ends of said tether.

24. A shelter according to claim 15 wherein said glide includes roller means engageable with said rail track.

25. A shelter according to claim 15 including anti-friction coating between said glide and said rail track for reducing the relative friction between them for free movement of said glide along said rail track.

26. A shelter according to claim 14 wherein said base is formed of sections.

27. A shelter according to claim 26 including means for fastening said sections together.

28. A shelter according to claim 14 wherein said dome cover is formed of sections.

29. A shelter according to claim 28 including means for fastening said sections together.

30. A dome-shaped shelter for animals comprising:
(A) a base having convex floor with a downwardly offset peripheral flange and an upwardly extending partition,
(B) a dome cover for said base having a downwardly offset peripheral flange seating in said base peripheral flange, an inwardly extending outside feeding stall nesting in said partition, and an animal opening in said side of said dome,
(C) a door hinged in said animal opening,
(D) a rail track around the lower edge of said dome above said flanges,
(E) a glide on and movable along said track,
(F) a tether having one end attached to said glide,
(G) at least one removable feeding bowl seated in said stall inside said track, and
(H) a plurality of spaced pin means penetrating said flanges for anchoring said dome and said base to their supporting surface.

31. A shelter according to claim 30 wherein said dome is made of reinforced plastic material.

32. A shelter according to claim 30 wherein said feeding stall contains a pair of removable bowls.

33. A shelter according to claim 32 including a removable container for maintaining a supply of ingredient into at least one of said bowls.

34. A shelter according to claim 30 wherein said base is provided with at least one draining aperture.

35. A shelter according to claim 30 wherein said dome cover is provided with an eaves trough above said opening.

36. A shelter according to claim 30 wherein said door is provided with a latch.

37. A shelter according to claim 30 wherein said dome is provided with spaced outwardly extending ribs.

38. A shelter according to claim 37 wherein said ribs are provided with means for supporting said rail track.

39. A shelter according to claim 30 wherein said glide comprises a wheeled trolley.

40. A shelter according to claim 30 wherein said tether includes a resilient section between its ends for absorbing jerks between the ends of said tether.

41. A shelter according to claim 30 including anti-friction coating between said glide and said track for reducing the relative friction between them for free movement of said glide along said track.

42. A shelter according to claim 30 including a base formed of sections.

43. A shelter according to claim 42 including bolt means for fastening said sections together.

44. A shelter according to claim 30 wherein said dome is formed of sections.

45. A shelter according to claim 44 including bolt means for fastening said sections together.

* * * * *

UNITED STATES PATENT AND TRADEMARK OFFICE
CERTIFICATE OF CORRECTION

PATENT NO.    : 4,161,924
DATED         : July 24, 1979
INVENTOR(S)   : Scott D. Welker It is certified that error appears in the above-identified patent and that said Letters Patent are hereby corrected as shown below:

Column 7, line 14, change "I" to -- or --; line 21, change "242" to -- 252 --. Column 9, line 42, change "(A)" to -- (B) --.

Signed and Sealed this

Fourth Day of March 1980

[SEAL]

Attest:

SIDNEY A. DIAMOND

*Attesting Officer*    *Commissioner of Patents and Trademarks*